Jan. 10, 1933.   C. W. JOHAM   1,893,500
ARTIFICIAL LEAF
Filed Dec. 22, 1931
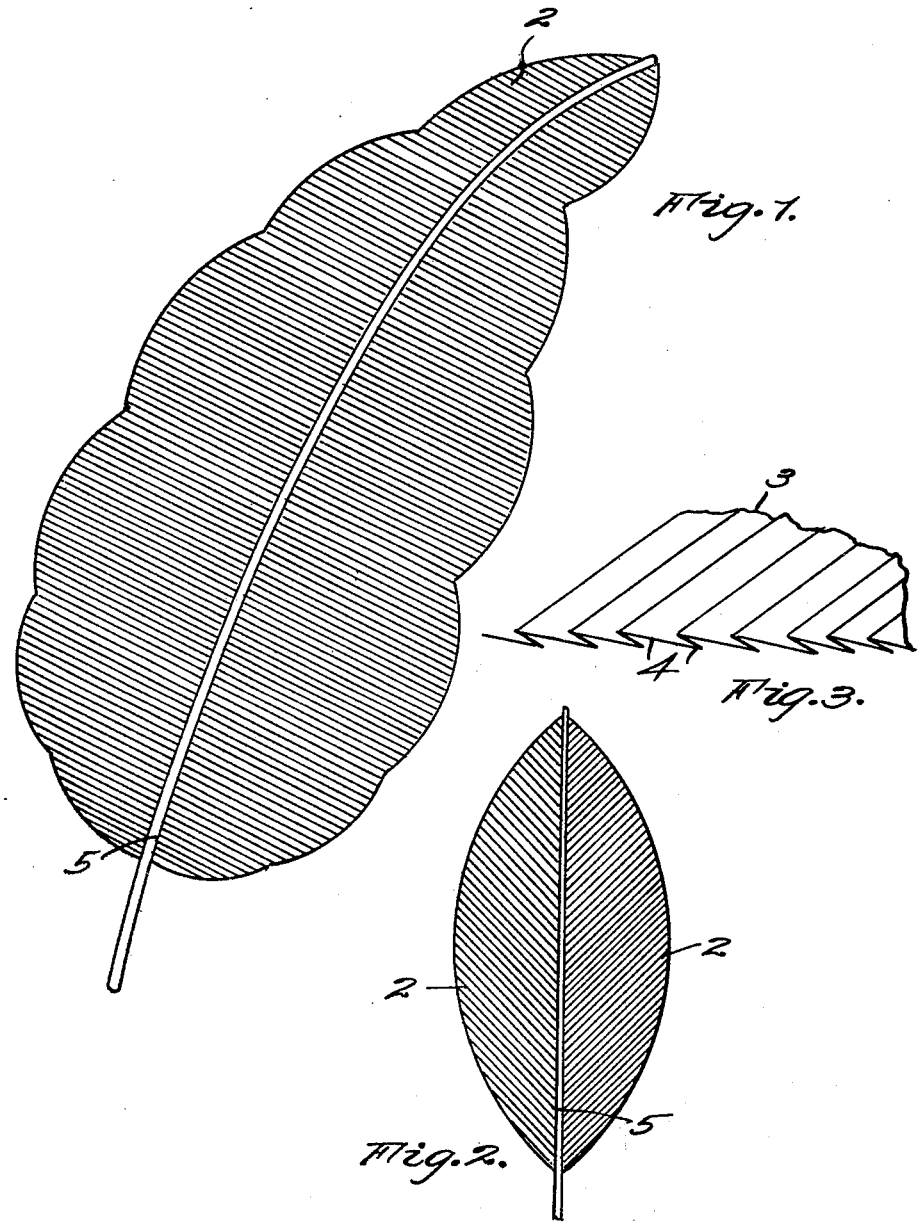
INVENTOR,
Chas. W. Joham,
BY F. E. Maynard
ATTORNEY Patented Jan. 10, 1933

1,893,500

UNITED STATES PATENT OFFICE

CHARLES W. JOHAM, OF LOS ANGELES, CALIFORNIA

ARTIFICIAL LEAF

Application filed December 22, 1931. Serial No. 582,556.

This invention relates to the construction of artificial plants and more especially to the construction of artificial leaves and blossom petals of various classes of vegetable growth.

It is an object of the invention to provide a plant leaf or petal, and a novel method for the production of the same. A further object is to provide for the production of a highly ornamental leaf or petal, and to provide a very economical method for the production of a very simple and low cost article of this class.

This invention consists in certain advancements in this art as set forth in the ensuing disclosure and having, with the above, additional objects and advantages, as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is a perspective of a leaf.

Figure 2 is a plan of a leaf of slightly modified form of construction.

Figure 3 is a perspective, on a somewhat enlarged scale, of a fragment of material employed in the formation of the leaf body.

The leaf or petal, as the case may be, is made of a body 2 cut in any desired outline of contour from a sheet of material 3 of any desired character and which has been pleated as at 4 in any desired manner with pleats of any desired pitch or depth of fold and spacing of fold.

An especially attractive leaf is produced by the employment of a woven fabric of any suitable tint or color; this being particularly effective because of the degree of transparency inherent in woven fabrics and which, when of desirable mesh, permit the transmission of light through the leaf.

The body 2 is cut from the pleated, stock sheet 3 so that the lines of the pleats are at an angle to the longitudinal axis of the finished leaf. In Fig. 1 the folds lie transverse to the petiole or stalk 5, extending longitudinally on the axis of the leaf, and in Fig. 2 the folds lie oblique, in opposite directions on the sides of the leaf body 2 along the petiole, or stalk or stem.

The petiole may be of any desired material, form of structure, and arrangement, and may be attached to the leaf structure 2 in any desired manner. Preferably, the petiole 5 is adhesively secured to the leaf structure as this is not only very inexpensive, but also affords a durable and inconspicuous method of securing the parts.

The pleated sheet material has an inherent stiffness and is yet pliable so that it may be folded or curled to leaf pattern, and the petiole 5 is preferably of such a degree of stiffness as to sustain the leaf longitudinally, and is sufficiently bendable so as to flex the leaf from end to end in any desired degree as may be useful in simulating a known natural leaf form.

The present method lends itself also in the production of artificial feathers as well as plant leaves and petals.

The petiole may consist of the well known wrapped wire element used extensively by artificial flower producers.

What is claimed is:

1. The method of making an artificial leaf which consists of pleating a sheet of material, cutting a leaf-shaped piece from the corrugated sheet, and affixing a stem to the leaf face.

2. The method of making an artificial leaf which consists of pleating a sheet of material, cutting a leaf-shaped piece from the corrugated sheet, and affixing a stem to the leaf face; the cutting being transverse to the pleats of the leaf.

3. The method of making an artificial leaf which consists of pleating a sheet of material, cutting a leaf-shaped piece from the corrugated sheet, and affixing a stem from end to end of the leaf.

CHARLES W. JOHAM.